(12) United States Patent
Kato et al.

(10) Patent No.: US 9,285,019 B2
(45) Date of Patent: Mar. 15, 2016

(54) CHAIN TRANSMISSION DEVICE FOR DRIVING CAMSHAFT

(75) Inventors: Akio Kato, Iwata (JP); Shinji Oishi, Iwata (JP)

(73) Assignee: NTN CORPORATION, Osaka (JP)

( * ) Notice: Subject to any disclaimer, the term of this patent is extended or adjusted under 35 U.S.C. 154(b) by 45 days.

(21) Appl. No.: 14/234,421

(22) PCT Filed: Jul. 18, 2012

(86) PCT No.: PCT/JP2012/068176
§ 371 (c)(1),
(2), (4) Date: Jan. 23, 2014

(87) PCT Pub. No.: WO2013/015166
PCT Pub. Date: Jan. 31, 2013

(65) Prior Publication Data
US 2014/0155208 A1    Jun. 5, 2014

(30) Foreign Application Priority Data

Jul. 25, 2011  (JP) .................................. 2011-161828

(51) Int. Cl.
*F16H 7/12*    (2006.01)
*F16H 7/08*    (2006.01)
(Continued)

(52) U.S. Cl.
CPC  *F16H 7/08* (2013.01); *F02B 67/06* (2013.01); *F16H 7/06* (2013.01); *F16H 7/18* (2013.01); *F16H 7/1281* (2013.01); *F16H 7/20* (2013.01);
(Continued)

(58) Field of Classification Search
CPC .......... F16H 2007/0874; F16H 7/1281; F16H 2007/081; F16H 7/1254; F16H 2007/0806

USPC .......................................... 474/111, 134, 135
See application file for complete search history.

(56) References Cited

U.S. PATENT DOCUMENTS

| 68,625 | A | * | 9/1867 | Hawley | ........................ | 474/137 |
| 993,684 | A | * | 5/1911 | Vom Hoff | ..................... | 474/131 |

(Continued)

FOREIGN PATENT DOCUMENTS

| EP | 2 395 261 | 12/2011 |
| JP | 09-236157 | 9/1997 |

(Continued)

OTHER PUBLICATIONS

International Search Report issued Oct. 23, 2012 in International (PCT) Application No. PCT/JP2012/068176.
(Continued)

*Primary Examiner* — Henry Liu
(74) *Attorney, Agent, or Firm* — Wenderoth, Lind & Ponack, L.L.P.

(57) ABSTRACT

A timing chain is looped over a driving sprocket attached to a crankshaft and driven sprockets attached to camshafts. A pivotable chain guide having a plurality of rotatable rollers for guiding movements of a timing chain is provided on one side of a slack side of the timing chain. Adjustment force of a chain tensioner is applied to a remote end of the pivotable chain guide remote from a center of pivoting movement of the pivotable chain guide, thereby pressing the plurality of rotatable rollers against the timing chain. The ratio ($D_1/D_2$) between a pitch circle diameter $D_1$ of the driving sprocket and an outer diameter $D_2$ of the plurality of rotatable rollers is determined within a range of 5/3 to 5/1.

3 Claims, 8 Drawing Sheets

(51) Int. Cl.
*F16H 7/18* (2006.01)
*F02B 67/06* (2006.01)
*F16H 7/06* (2006.01)
*F16H 7/20* (2006.01)

(52) U.S. Cl.
CPC . *F16H 2007/0865* (2013.01); *F16H 2007/0893* (2013.01)

(56) References Cited

U.S. PATENT DOCUMENTS

| | | | | |
|---|---|---|---|---|
| 1,338,293 A * | 4/1920 | Fuchs | 474/134 |
| 1,480,078 A * | 1/1924 | Kegresse | 180/9.62 |
| 1,499,920 A * | 7/1924 | Godden | 193/37 |
| 1,579,245 A * | 4/1926 | Pennington | 305/134 |
| 2,341,273 A * | 2/1944 | Helberg | 74/501.5 R |
| 2,349,281 A * | 5/1944 | Kendall | 384/547 |
| 2,709,371 A * | 5/1955 | Hale | 474/48 |
| 2,729,110 A * | 1/1956 | Killian et al. | 474/153 |
| 2,827,153 A * | 3/1958 | Olk et al. | 198/790 |
| 2,892,206 A * | 6/1959 | Deibel | 15/250.25 |
| 2,964,155 A * | 12/1960 | Flowers et al. | 193/35 R |
| 3,586,142 A * | 6/1971 | Inwood et al. | 193/35 R |
| 3,598,194 A * | 8/1971 | Wappler et al. | 180/6.2 |
| 3,888,217 A * | 6/1975 | Hisserich | 123/90.31 |
| 3,930,323 A * | 1/1976 | Marold et al. | 37/423 |
| 3,950,046 A * | 4/1976 | Lubbersmeyer | 384/546 |
| 3,951,484 A * | 4/1976 | Bowman, Jr. | 384/603 |
| 4,068,535 A * | 1/1978 | Sheets | 474/132 |
| 4,078,642 A * | 3/1978 | Payne | 193/37 |
| 4,208,078 A * | 6/1980 | Miki | 384/572 |
| 4,213,523 A * | 7/1980 | Frost et al. | 193/37 |
| 4,416,647 A * | 11/1983 | White, Jr. | 474/134 |
| 4,416,648 A * | 11/1983 | Radocaj | 474/135 |
| 4,474,562 A * | 10/1984 | Heurich | 474/133 |
| 4,610,646 A * | 9/1986 | Walter et al. | 474/199 |
| 4,626,231 A * | 12/1986 | Nagano | 474/152 |
| 4,723,516 A * | 2/1988 | Slagley et al. | 123/90.16 |
| 4,767,387 A * | 8/1988 | Matsuoka et al. | 474/168 |
| 4,892,508 A * | 1/1990 | Ryan et al. | 474/101 |
| 4,908,006 A * | 3/1990 | Burysek et al. | 474/117 |
| 4,913,689 A * | 4/1990 | Morishita et al. | 474/170 |
| 4,969,548 A * | 11/1990 | Kornylak | 193/35 R |
| 4,981,116 A * | 1/1991 | Trinquard | 123/90.31 |
| 5,244,439 A * | 9/1993 | Rogus | 474/136 |
| 5,441,354 A * | 8/1995 | Broder et al. | 400/636.3 |
| 5,441,458 A * | 8/1995 | Rogus | 474/189 |
| 5,848,846 A * | 12/1998 | Sugiyama et al. | 384/625 |
| 5,961,411 A * | 10/1999 | Tsutsumi et al. | 474/111 |
| 5,967,925 A * | 10/1999 | Meckstroth | 474/175 |
| 6,041,490 A * | 3/2000 | Tabuchi et al. | 29/607 |
| 6,062,998 A * | 5/2000 | Kumakura et al. | 474/111 |
| 6,179,740 B1 * | 1/2001 | Walker | 474/134 |
| 6,189,639 B1 * | 2/2001 | Fuse et al. | 180/231 |
| 6,196,375 B1 * | 3/2001 | Cozza | 198/836.1 |
| 6,220,211 B1 * | 4/2001 | Line | 123/90.15 |
| 6,245,436 B1 * | 6/2001 | Boyle et al. | 428/472.2 |
| 6,254,503 B1 * | 7/2001 | Chiba et al. | 474/8 |
| 6,346,057 B1 * | 2/2002 | Edelmann | 474/135 |
| 7,104,909 B2 * | 9/2006 | Asbeck et al. | 474/135 |
| 7,419,447 B2 * | 9/2008 | Serkh | 474/134 |
| 7,780,556 B2 * | 8/2010 | Sakanaka et al. | 474/8 |
| 7,866,292 B2 * | 1/2011 | LaBere et al. | 123/90.31 |
| 7,909,717 B2 * | 3/2011 | Boussaguet et al. | 474/136 |
| 8,282,289 B2 * | 10/2012 | Oishi | 384/572 |
| 8,684,895 B2 * | 4/2014 | Severing et al. | 492/58 |
| 2001/0053727 A1 * | 12/2001 | Nakashima et al. | 474/242 |
| 2003/0092521 A1 * | 5/2003 | Konno | 474/111 |
| 2004/0002401 A1 * | 1/2004 | Iverson | 474/134 |
| 2004/0116224 A1 * | 6/2004 | Sakamoto | 474/152 |
| 2005/0031240 A1 * | 2/2005 | Dodoro et al. | 384/494 |
| 2006/0153485 A1 * | 7/2006 | Maeda et al. | 384/569 |
| 2007/0026986 A1 * | 2/2007 | Walker | 474/134 |
| 2007/0110348 A1 * | 5/2007 | Obara | 384/107 |
| 2008/0070731 A1 * | 3/2008 | Vrsek et al. | 474/134 |
| 2010/0160102 A1 * | 6/2010 | Haag et al. | 474/166 |
| 2011/0294612 A1 * | 12/2011 | Kato | 474/91 |
| 2013/0324339 A1 * | 12/2013 | Kato et al. | 474/137 |
| 2013/0331211 A1 * | 12/2013 | Kato et al. | 474/101 |

FOREIGN PATENT DOCUMENTS

| | | |
|---|---|---|
| JP | 2001-187948 | 7/2001 |
| JP | 2011-047473 | 3/2011 |
| JP | 2011-058551 | 3/2011 |
| JP | 2011-058552 | 3/2011 |
| WO | 2010/090139 | 8/2010 |
| WO | WO 2010090139 A1 * | 8/2010 ............ F16H 7/08 |

OTHER PUBLICATIONS

Written Opinion of the International Searching Authority issued Oct. 23, 2012 in International (PCT) Application No. PCT/JP2012/068176 (with English translation).
European Office Action dated Jul. 3, 2015 issued in corresponding European Patent Application No. 12818007.2.

* cited by examiner

CHAIN TRANSMISSION DEVICE FOR DRIVING CAMSHAFT

BACKGROUND OF THE INVENTION

Technical Field

The present invention relates to a chain transmission device for driving a camshaft.

BACKGROUND ART

In a chain transmission device for driving a camshaft in which a timing chain is looped over a driving sprocket attached to a crankshaft and a driven sprocket attached to the camshaft, a pivotable chain guide is provided on one side of the slack side of the timing chain, and adjustment force of a chain tensioner is applied to a remote end of the chain guide from the center of pivoting movement of the chain guide to tighten the timing chain, thereby preventing the chain from becoming slack and flapping.

Another chain guide is fixed in position on the tight side of the timing chain to guide the movement of the timing chain, thereby further reducing flapping of the chain.

One known chain guide for adjusting the tension and for guiding the movement of the timing chain is configured to guide the timing chain by sliding contact with its surface. However, this chain guide has a problem in that the movement resistance of the timing chain is large and a transmission torque loss is significant.

In order to solve this problem, the below-identified Patent Document 1 proposes a chain guide in which both ends of a plurality of roller shafts arranged in a curve form are supported by a guide base elongated in the moving direction of a timing chain, rollers in the form of roller bearings are rotatably supported on the respective roller shafts, and the timing chain is movably supported by the plurality of rollers.

In the above chain guide, since the timing chain is guided while being in rolling contact with the plurality of rollers, movement resistance of the timing chain is small and a transmission torque loss is insignificant.

CITATION LIST

Patent Document

Patent Document 1: International Publication No. 2010/090139

Problem to be Solved by the Invention

In the chain transmission device for driving the camshaft disclosed in Patent Document 1 above, nothing is mentioned about the size relation between the driving sprocket and the rollers for guiding the movement of the chain. If the ratio between the pitch circle diameter of the driving sprocket and the outer diameter of the rollers for guiding the movement of the chain is too large, while the engine speed is high, the rollers are rotated at such high speed that lubrication becomes insufficient between the rollers and the roller shafts. If the ratio between the pitch circle diameter of the driving sprocket and the outer diameter of the rollers is too small, the roller diameter tends to be large to such an extent as to make proper engine layout difficult. Such large-diameter rollers are also heavier in weight.

SUMMARY OF THE INVENTION

An object of the present invention is to prevent insufficient lubrication of chain guiding rollers in a chain transmission device for driving a camshaft, and to make it easier to properly lay out the engine.

Means for Solving the Problem

In order to achieve the above object, the present invention provides a chain transmission device for driving a camshaft, including a driving sprocket mounted to a crankshaft, a driven sprocket mounted to a camshaft, a timing chain looped over the driving sprocket and the driven sprocket, a pivotable chain guide provided on one side of the slack side of the timing chain, and retaining a plurality of rotatable rollers for guiding movements of the timing chain, the rollers being spaced from each other in the direction in which the timing chain is moved, and a chain tensioner for applying an adjustment force to a remote end of the chain guide remote from the center of pivoting movement of the chain guide, thereby pressing the rollers against the timing chain, wherein the ratio ($D_1/D_2$) between the pitch circle diameter $D_1$ of the driving sprocket and the outer diameter $D_2$ of the rollers is set within the range of 5/3 to 5/1.

The maximum rotation speed of the crankshaft in an engine is generally about 8,000 rpm. Thus, if the ratio ($D_1/D_2$) between the pitch circle diameter $D_1$ of the driving sprocket attached to the crankshaft and the outer diameter $D_2$ of the rollers is set at 5/1 or less as described above, the rollers never rotate at a speed exceeding 40,000 rpm, thus preventing insufficient lubrication of the rollers.

The driving sprocket provided on the crankshaft normally has a pitch circle diameter $\phi$ of about 40 to 50 mm. Thus, if the ratio ($D_1/D_2$) between the pitch circle diameter $D_1$ of the driving sprocket and the outer diameter $D_2$ of the rollers is set at 5/3 or more, the outer diameter $\phi$ of the rollers never exceeds 30.0 mm, so that it is easier to lay out the engine. Such small-diameter rollers are also lighter in weight and thus easier to handle.

This chain transmission device may further include a fixed chain guide provided on one side of the tight side of the timing chain, and having the same configuration as the pivotable chain guide to further effectively prevent flapping of the timing chain.

The rollers may be needle roller bearings or cylindrical roller bearings each having an outer race and a plurality of roller elements received in the outer race. With this arrangement, the rollers can be smoothly rotated by contact with the timing chain, so that movement resistance of the timing chain can be reduced to a large extent.

Effect of the Invention

In the present invention, as described above, since the ratio ($D_1/D_2$) between the pitch circle diameter $D_1$ of the driving sprocket and the outer diameter $D_2$ of the rollers is set within the range of 5/3 to 5/1, it is possible to prevent insufficient lubrication of the rollers even while the engine speed is high. In addition, the diameter of the rollers is not increased more than necessary, so as to make the engine layout easier.

MODE FOR CARRYING OUT THE INVENTION

Figure 1:
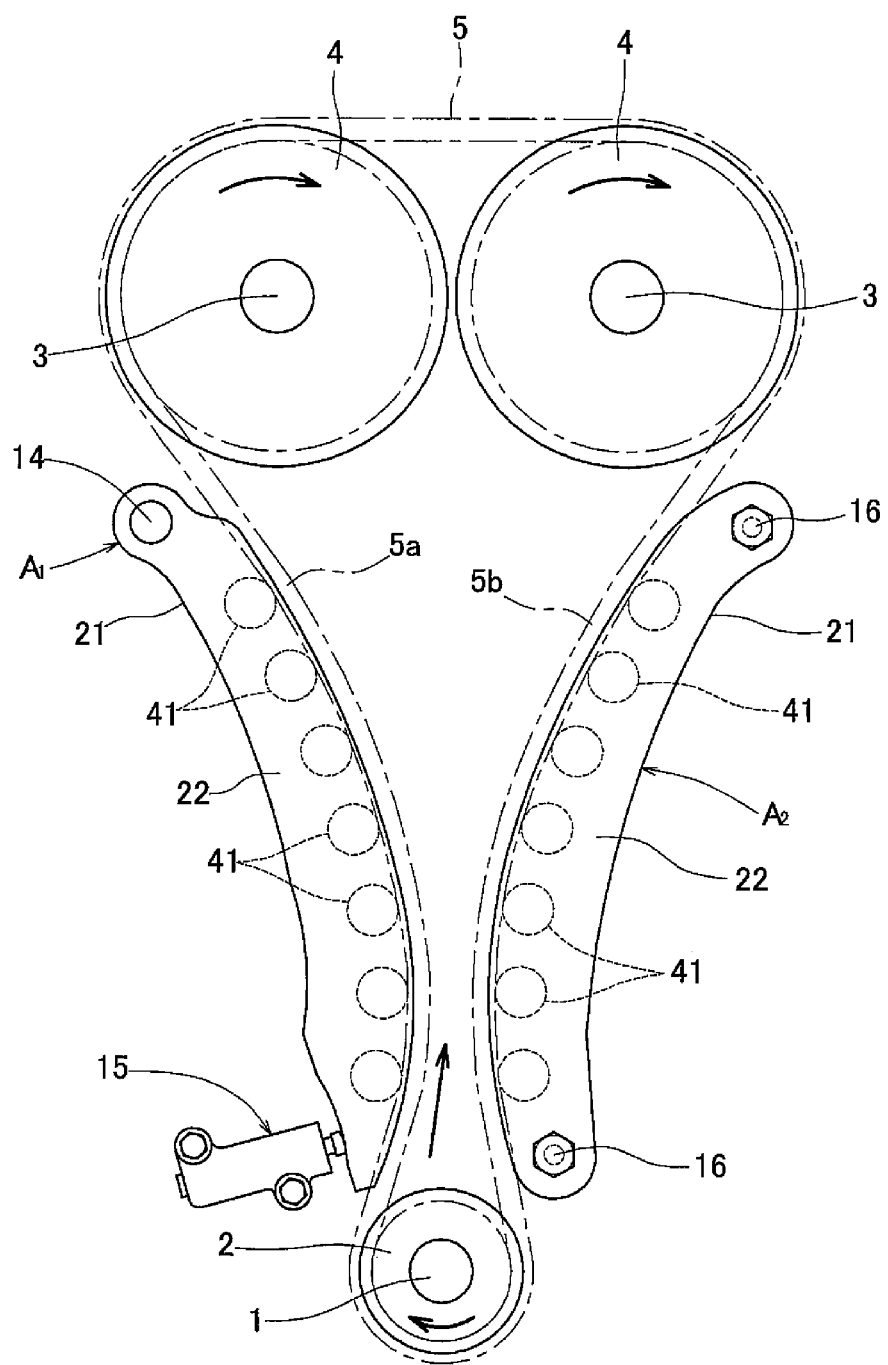
FIG. 1 schematically shows a chain transmission device embodying the present invention.

Now referring to the drawings, the embodiment of the present invention is described. FIG. 1 shows a chain transmission device for driving camshafts in which a timing chain 5 is looped over a driving sprocket 2 mounted to one end of a crankshaft 1 and driven sprockets 4 mounted to ends of respective two camshafts 3.

The timing chain 5 may be a roller chain or a silent chain.

The crankshaft 1 is rotated in the direction shown by the corresponding arrow of FIG. 1. By the rotation of the crankshaft 1, the timing chain 5 moves in the direction shown by the corresponding arrow of FIG. 1. As a result, the portion of the chain 5 extending from the driving sprocket 2 to the driven sprocket 4 positioned on the left side of FIG. 1 becomes slack (this side of the chain is thus referred to as the "slack side 5a"), and the portion of the chain extending from the other driven sprocket 4 to the driving sprocket 2 becomes tight ("tight side 5b"). A chain guide $A_1$ is provided on one side of the slack side 5a of the chain 5.

The chain guide $A_1$ is elongated in the moving direction of the timing chain 5. The chain guide $A_1$ has its upper end supported by a pivot shaft 14 protruding from an engine block so as to be pivotable about the pivot shaft 14. Adjustment force of a chain tensioner 15 is applied to the lower end, i.e. the end remote from the pivot shaft 14, of the chain guide $A_1$, so that this end of the chain guide is pressed against the slack side 5a of the chain.

A chain guide $A_2$ is provided on the opposite side of the tight side 5b of the timing chain 5. As with the pivotable chain guide $A_1$, this chain guide $A_2$ is elongated in the moving direction of the timing chain 5, with both ends thereof fixed by fastening bolts 16 screwed into the engine block, to guide the movement of the timing chain 5.

The pivotable chain guide $A_1$ and the fixed chain guide $A_2$ have the same configuration, except that the pivotable chain guide $A_1$ has at one end thereof an insertion hole 24 into which a shaft can be is inserted, whereas the fixed chain guide $A_2$ has at both ends thereof insertion holes into which bolts can be inserted.

Therefore, the configuration of only the pivotable chain guide $A_1$ will be described below. Regarding the fixed chain guide $A_2$, the same reference numerals will be given to the same parts and description thereof will be omitted.

Figure 2:
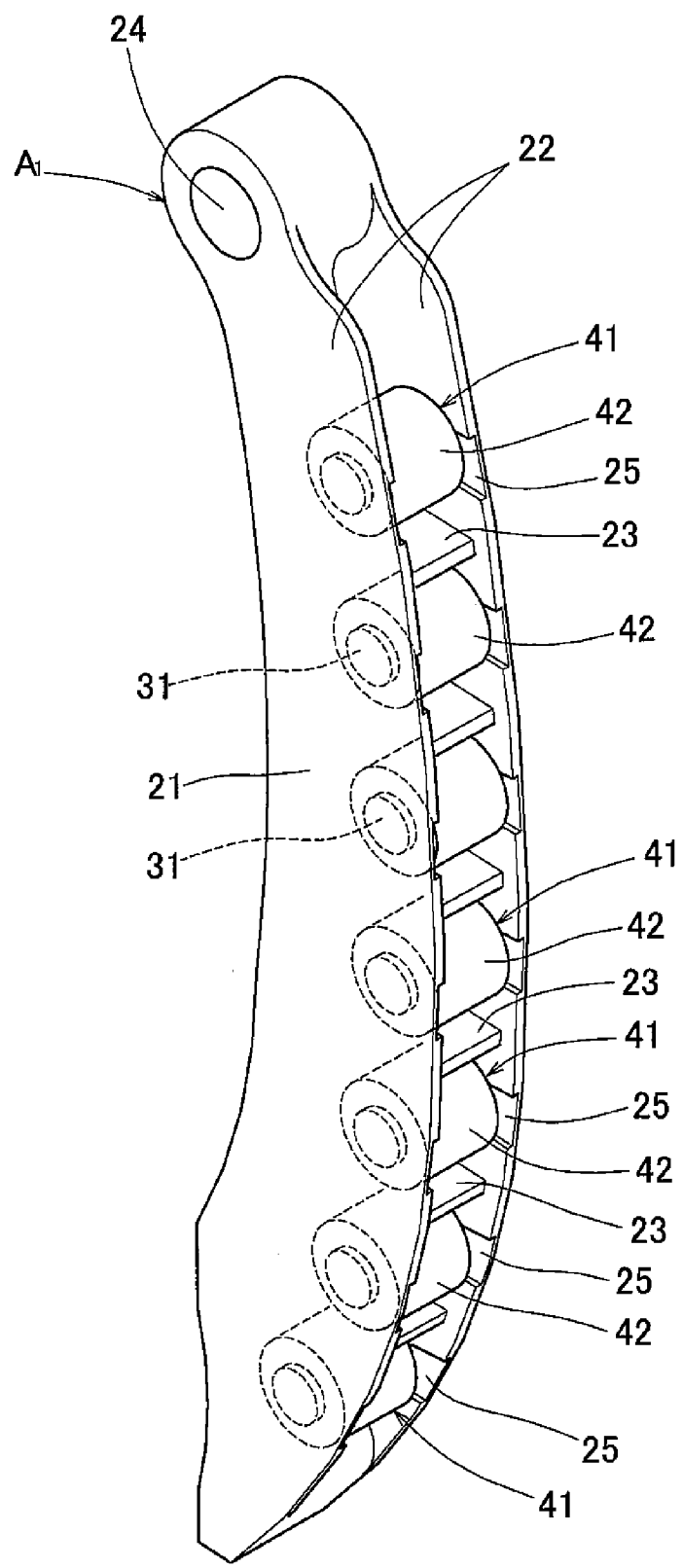
FIG. 2 is a perspective view of a chain guide according to the present invention.
Figure 3:
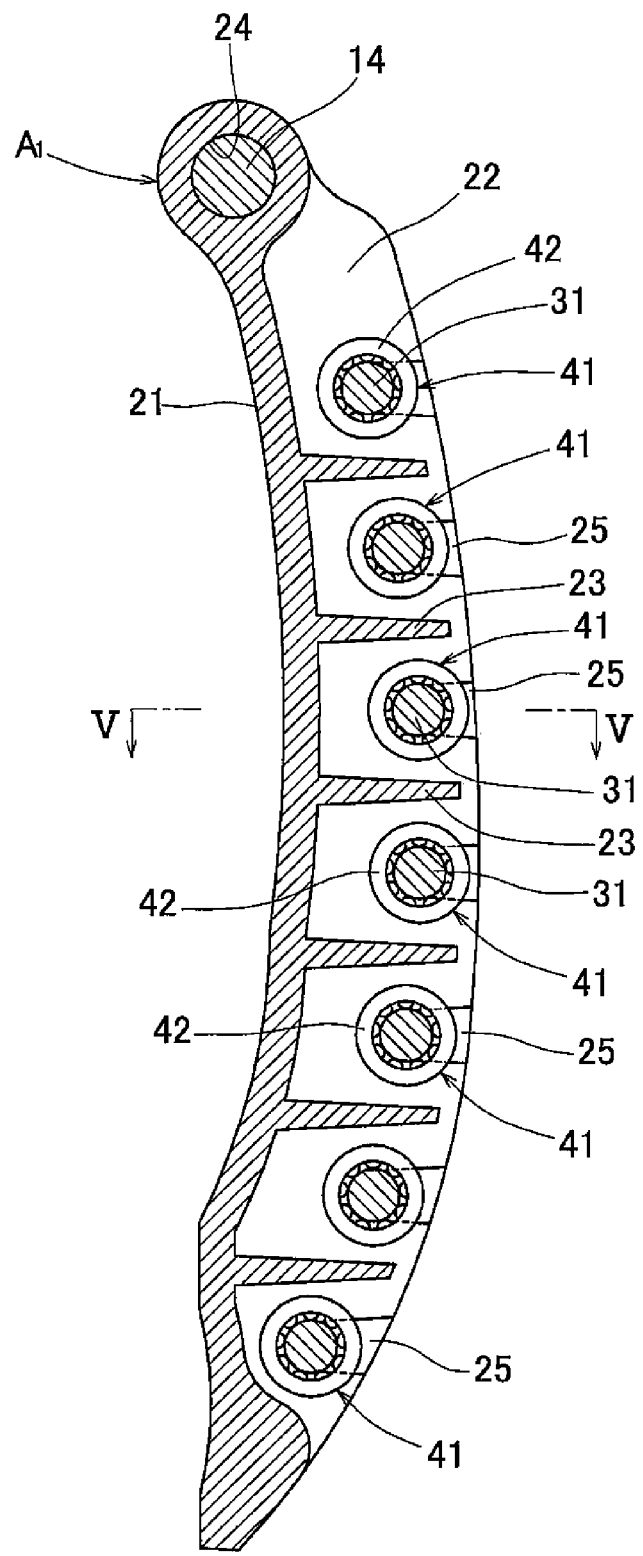
FIG. 3 is a vertically sectional view of FIG. 2.
Figure 4:
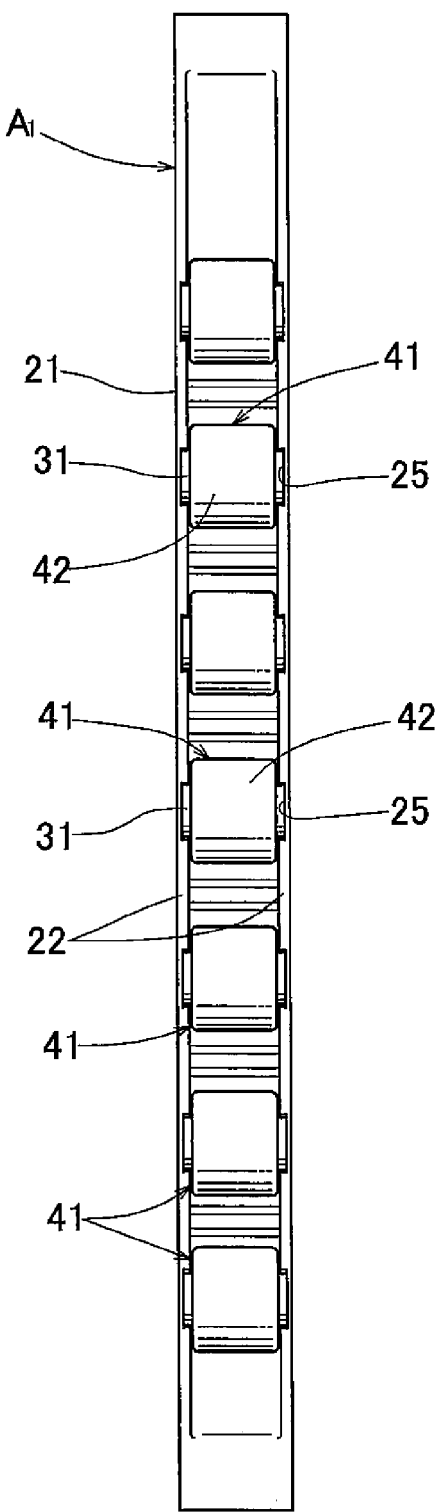
FIG. 4 is a right-hand side view of FIG. 3.
Figure 5:
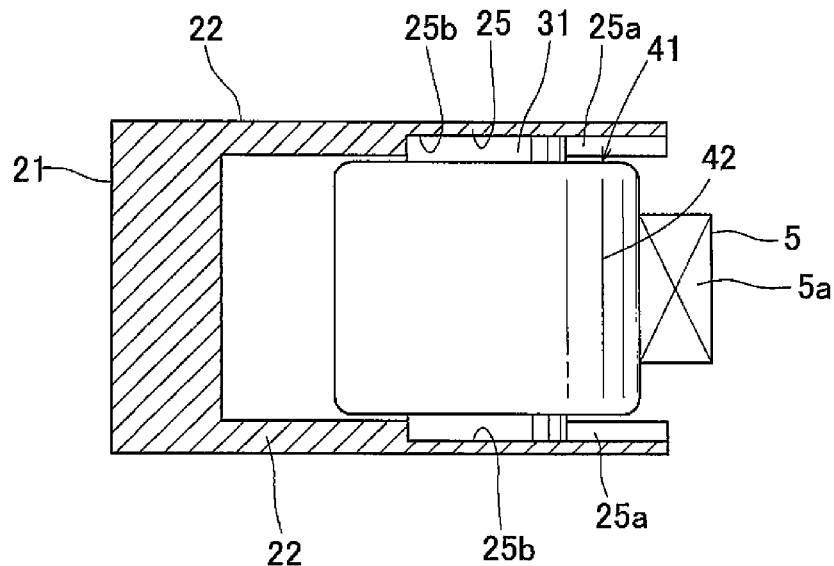
FIG. 5 is a sectional view taken along line V-V of FIG. 3.

As shown in FIGS. 2 to 4, the chain guide $A_1$ includes a guide base 21 elongated in the moving direction of the timing chain 5, a plurality of roller shafts 31 spaced from each other in the longitudinal direction of the guide base 21, and a plurality of chain guiding rollers 41 rotatably supported on the respective roller shafts 31.

The guide base 21 includes an opposed pair of side plate portions 22, and a plurality of space retaining plates 23 provided between the side plate portions 22 and spaced from each other in the longitudinal direction. The side plate portions 22 are arch-shaped, and connected together at their upper ends by a portion formed with the insertion hole 24 into which the pivot shaft 14 is inserted.

A plurality of bearing recesses 25 for supporting the shaft ends of the roller shafts 31 are formed in the opposed inner surfaces of the respective side plate portions 22 so as to be spaced from each other in the longitudinal direction of the side plate portions 22.

Figure 7:
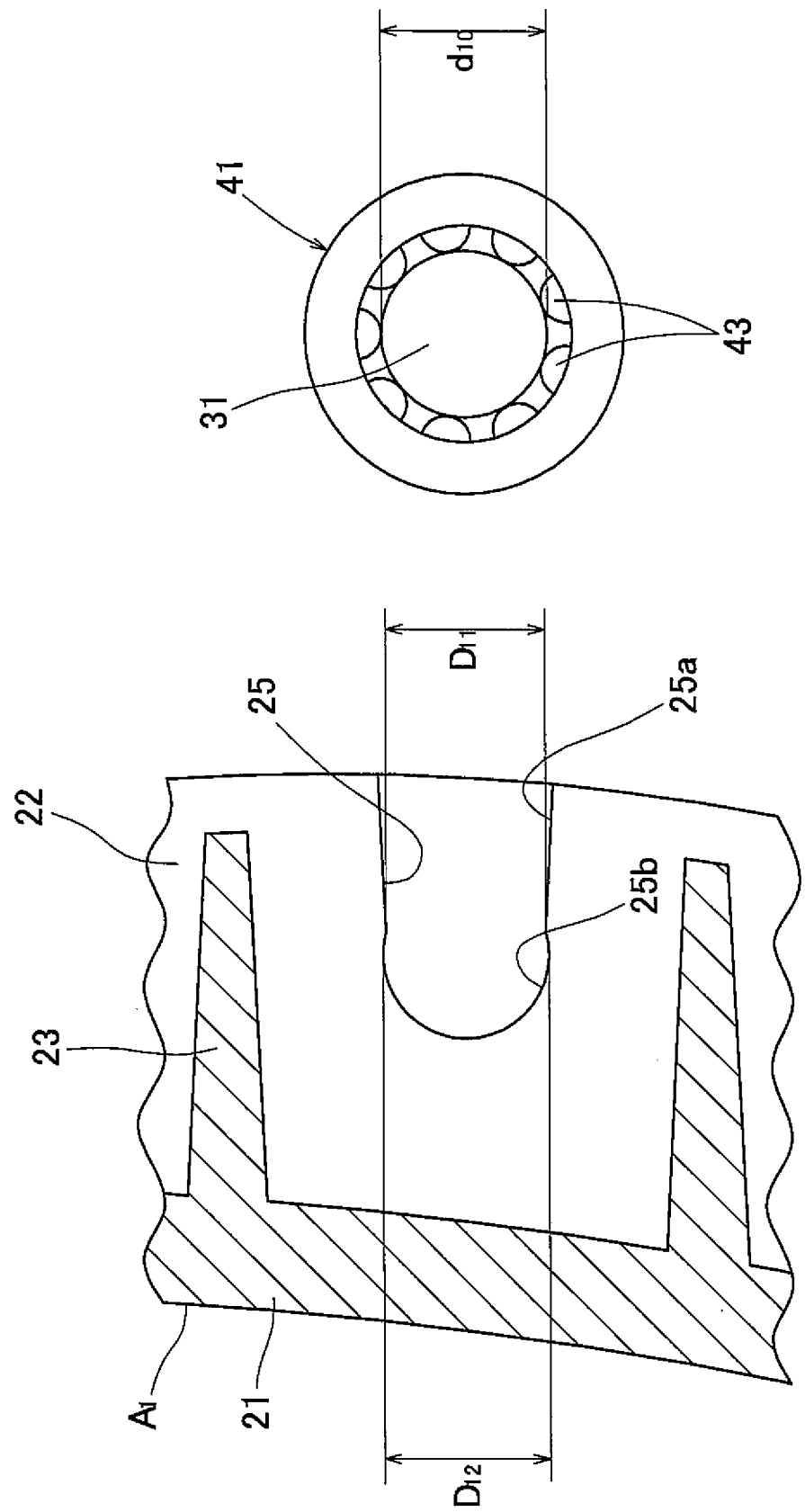
FIG. 7 is an exploded front view showing a part of a guide base and the roller.

As shown in FIG. 7, the bearing recesses 25 each include a tapered groove portion 25a extending in the width direction of the side plate portion 22 from the outer side surface of the side plate portion 22, i.e. its surface facing the timing chain 5, and having a first end open to the outer side surface and a second opposite end narrower than the first end, and a circular recess portion 25b connected to the second narrow end of the tapered groove portion 25a and serving as a shaft support portion. The roller shafts 31 can be passed through the respective tapered groove portions 25a and fitted into and supported by the circular recess portions 25b.

This chain guide is designed to satisfy the relation $d_{10} > D_{12} > D_{11}$, where $D_{11}$ is the width of the second narrow ends of the tapered groove portions 25a, $D_{12}$ is the inner diameter of the circular recess portions 25b, and $d_{10}$ is the outer diameter of the roller shafts 31. With this arrangement, when the roller shafts 31 are pushed into the respective circular recess portions 25b through the taper groove portions 25a, the roller shafts 31 are fitted and supported with interference in the circular recess portions 25b.

In the embodiment, the bearing recesses 25 are arranged such that the centers of the circular recess portions 25b lie on a convex circular arc. But they may be arranged such that the centers of the circular recess portions 25b lie on a curved line other than a convex circular arc.

The guide base 21 is formed by molding synthetic resin. As the synthetic resin, a resin excellent in oil resistance, weather resistance, and strength is preferably used. Such resins include polyamide 46 (PA 46) and polyamide 66 (PA 66). In order to further improve mechanical strength, reinforcing glass fiber is preferably mixed into the resin.

The guide base 21 may be formed by casting or die-casting a light metal such as an aluminum alloy and a magnesium alloy.

The roller shafts 31 are fitted in the respective bearing recesses 25. The roller shafts 31 are made of SUJ2 or SC material. In order to improve wear resistance, the roller shafts 31 are thermally treated to enhance hardness. As the thermal treatment, bright quenching is used in the embodiment. However, high frequency quenching or carburizing quenching may be performed instead. Alternatively, nitrocarburizing quenching may be performed.

Figure 6:
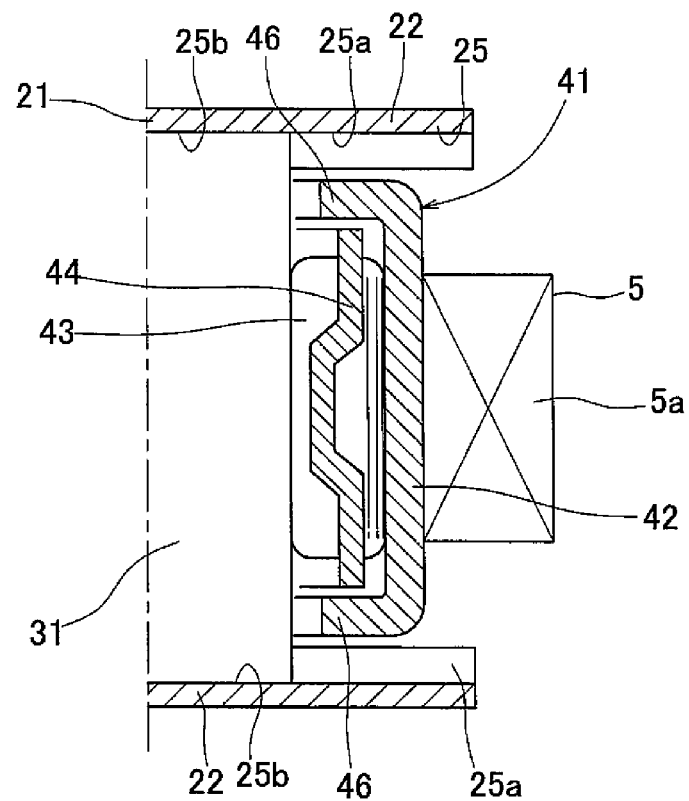
FIG. 6 is a sectional view of a roller shown in FIG. 5.

The rollers 41 are rotatably supported on the respective roller shafts 31. As shown in FIG. 6, in the embodiment, needle roller bearings are used as the rollers 41. Each of the needle roller bearings 41 includes an outer race 42, a plurality of needle roller elements 43 received in the outer race, and a retainer 44 retaining the needle roller elements 43.

The outer race 42 is formed into a shell shape by drawing a metal plate of SPC or SCM, and hardened by thermal treatment. In order to more easily perform drawing, the metal plate to be formed into the outer race 42 is preferably thin. However, if a thin metal plate is used, the cylindricity is lowered during thermal treatment. Therefore, when the timing chain 5 is guided, abnormal noises are generated due to contact between the outer race 42 and the timing chain 5.

In order to avoid this problem, a thick metal plate having thickness of about 1 mm to 3 mm is used and drawn in the embodiment.

Inwardly extending flanges 46 for retaining the retainer 44 are formed at both ends of the shell-shaped outer race 42. In order to more easily install the needle roller bearings 41, the inwardly extending flanges 46 are formed by bending after installing the retainer 44 for retaining the needle roller elements 43.

Figure 8:
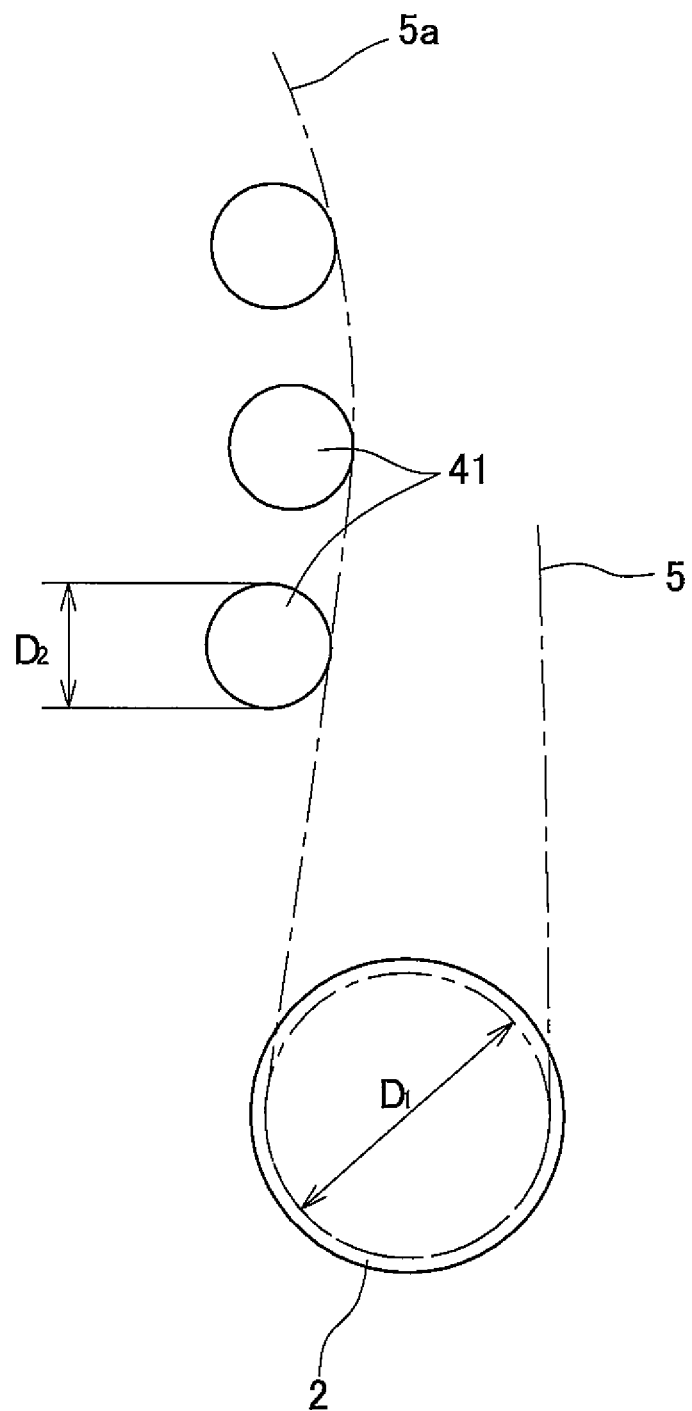
FIG. 8 schematically shows the size relation between a driving sprocket and the rollers.

As shown in FIG. 8, the driving sprocket 2 and the rollers 41 are designed such that the ratio ($D_1/D_2$) between the pitch circle diameter $D_1$ of the driving sprocket 2 and the outer diameter $D_2$ of the rollers is 5/3 to 5/1.

In general, the pitch circle diameter $\phi$ of the driving sprocket 2 is about 40 to 50 mm. Therefore, the outer diameter of the rollers 41 is determined at about 8 to 30 mm in the embodiment.

Figure 9:
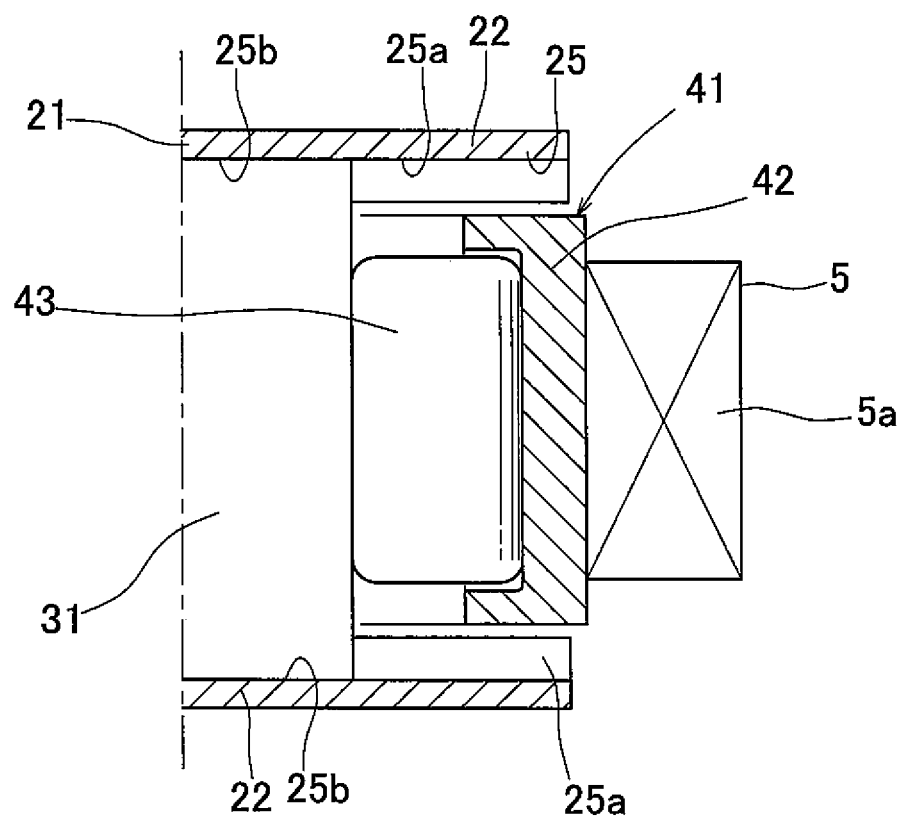
FIG. 9 is a sectional view of a different roller.

The outer races 42 of the needle roller bearings may be formed by shaving. As shown in FIG. 9, cylindrical roller bearings 41 may be used in place of such needle roller bearings. In either case, the roller bearings may be full type roller bearings, i.e. bearings without a retainer. In FIG. 9, the reference numeral 42 denotes outer races of the cylindrical roller bearings 41, and the reference numeral 43 denotes cylindrical roller elements.

Now the operation of the chain transmission device shown in the embodiment is described. While the rotation of the crankshaft 1 is being transmitted to the camshafts 3 by the movement of the timing chain 5 looped over the driving sprocket 2 and the driven sprockets 4, the chain tensioner 15 absorbs fluctuations in tension of the timing chain 5 due to fluctuations in loads applied, thereby preventing the timing chain from becoming slack and flapping.

While torque (rotation) of the crankshaft 1 is being transmitted to the camshafts 3, the respective rollers 41, which are roller bearings, of the pivotable chain guide $A_1$ and the fixed chain guide $A_2$ are rotated by contact with the timing chain 5, which is moving at high speed, so that the timing chain 5 is guided while being in rolling contact with the rollers.

Since the timing chain 5 is guided while being in rolling contact with the rollers 41 in the above manner, movement resistance of the timing chain 5 is insignificant, so that the timing chain 5 smoothly moves, and the torque is transmitted without loss.

If the ratio between the pitch circle diameter $D_1$ of the driving sprocket 2 and the outer diameter $D_2$ of the rollers 41, which guide the movement of the timing chain 5, is too large, while the engine torque is being transmitted to the camshafts 3 through the timing chain 5 with the engine speed near the maximum speed, which is about 8000 rpm, the rollers 41 rotate at such high speed that lubrication becomes insufficient at contact portions between the outer races 42 and the needle roller elements (cylindrical roller elements) 43 and/or at contact portions between the needle roller elements (cylindrical roller elements) 43 and the roller shafts 31.

If the ratio between the pitch circle diameter $D_1$ of the driving sprocket 2 and the outer diameter $D_2$ of the rollers 41 is too small, the outer diameter of the rollers 41 tends to be large to such an extent as to make proper layout of the engine difficult. The rollers 41 are heavy too.

In the embodiment, since the ratio ($D_1/D_2$) between the pitch circle diameter $D_1$ of the driving sprocket 2 attached to the crankshaft 1 and the outer diameter $D_2$ of the rollers 41 is determined at 5/1 or less, the rollers 41 never rotate at a speed exceeding 40000 rpm. This prevents insufficient lubrication at contact portions of the needle roller elements (cylindrical roller elements) 43.

Since the driving sprocket 2 provided on the crankshaft 1 normally has a pitch circle diameter $\phi$ of about 40 to 50 mm, and the ratio ($D_1/D_2$) between the pitch circle diameter $D_1$ of the driving sprocket 2 and the outer diameter $D_2$ of the rollers is set at 5/3 or more, the outer diameter $\phi$ of the rollers 41 never exceeds 30.0 mm. Therefore, the rollers are lighter in weight and thus can be more easily handled. It is easy to lay out the engine too.

DESCRIPTION OF REFERENCE NUMERALS $A_1$: Chain guide
$A_2$: Chain guide
1: Crankshaft
2: Driving sprocket
3: Camshaft
4: Driven sprocket
5: Timing chain (chain)
31: Roller shaft
41: Roller (needle roller bearing)
42: Outer race
43: Needle roller element (cylindrical roller element)

The invention claimed is:

1. A chain transmission device for driving a camshaft, comprising:
    a driving sprocket mounted to a crankshaft;
    a driven sprocket mounted to a camshaft;
    a timing chain looped over the driving sprocket and the driven sprocket;
    a pivotable chain guide provided on one side of a slack side of the timing chain, and retaining a plurality of rotatable rollers for guiding movements of the timing chain so as to be spaced from each other in a direction in which the timing chain is moved; and
    a chain tensioner for applying an adjustment force to a remote end of the pivotable chain guide remote from a center of pivoting movement of the pivotable chain guide, thereby pressing the plurality of rotatable rollers against the timing chain,
    wherein the driving sprocket and the plurality of rotatable rollers are designed such that a ratio ($D_1/D_2$) between a pitch circle diameter $D_1$ of the driving sprocket and an outer diameter $D_2$ of the plurality of rotatable rollers is within a range of 5/3 to 5/1,
    wherein each of the plurality of rotatable rollers is a roller bearing including a shell-shaped outer race which is formed by drawing a thick metal plate having a thickness of 1 mm to 3 mm and has inwardly extending flanges at both ends thereof, a plurality of roller elements received in the shell-shaped outer race, and a retainer for retaining the plurality of roller elements, and
    wherein the shell-shaped outer race contacts and guides the timing chain.

2. The chain transmission device according to claim 1, further comprising a fixed chain guide fixed in position on one side of a tight side of the timing chain, and having a plurality of rotatable rollers configured in the same manner as the plurality of rotatable rollers of the pivotable chain guide.

3. The chain transmission device according to claim 2, wherein the pivotable chain guide has only one insertion hole, and the fixed chain guide has a plurality of insertion holes.

* * * * *